(12) United States Patent
Kim

(10) Patent No.: US 10,566,807 B2
(45) Date of Patent: Feb. 18, 2020

(54) BATTERY PROTECTION SYSTEM AND METHOD

(71) Applicant: LG Chem, Ltd., Seoul (KR)

(72) Inventor: Doyul Kim, Daejeon (KR)

(73) Assignee: LG Chem, Ltd. (KR)

( * ) Notice: Subject to any disclaimer, the term of this patent is extended or adjusted under 35 U.S.C. 154(b) by 76 days.

(21) Appl. No.: 15/788,321

(22) Filed: Oct. 19, 2017

(65) Prior Publication Data

US 2018/0109124 A1    Apr. 19, 2018

(30) Foreign Application Priority Data

Oct. 19, 2016  (KR) .................. 10-2016-0135817

(51) Int. Cl.
*H02J 7/00*     (2006.01)
*H02H 3/24*     (2006.01)
*H02H 7/18*     (2006.01)
*B60L 3/04*     (2006.01)
*B60L 3/00*     (2019.01)
*H02H 5/04*     (2006.01)

(52) U.S. Cl.
CPC .......... *H02J 7/0029* (2013.01); *H02J 7/0065* (2013.01); *H02J 2007/0067* (2013.01)

(58) Field of Classification Search
CPC ......... B60L 2240/545; B60L 2240/547; B60L 2240/549; B60L 3/0046; B60L 2240/54; B60L 2240/70; B60L 2240/80; B60L 2260/44; B60L 3/12; B60L 58/16; B60L 58/21; B60L 3/04; B60L 3/00; G01R 31/385; G01R 31/389; G01R 31/396; H01M 10/441; H01M 10/48; H01M 2220/20; H01M 2/1077; H02J 7/0021; H02J 2007/004; H02J 2007/0067; H02J 7/0029; H02J 7/0032; H02J 7/0063; H02J 7/0065; H02J 7/00; Y02T 10/7005; Y02T 10/7055; Y02T 10/7061; Y02T 10/7291; Y02T 90/16; H02H 7/18; H02H 3/243; H02H 5/04; H02H 3/24

See application file for complete search history.

(56) References Cited

U.S. PATENT DOCUMENTS

2013/0187615 A1   7/2013  Kimura
2013/0200902 A1*  8/2013  Kurimoto .......... H01M 2/1077
                                              324/430
2016/0325726 A1* 11/2016  Liang ................ B60W 20/12

FOREIGN PATENT DOCUMENTS

JP   2013150521 A   8/2013
KR   10-0621072 B1  9/2006

\* cited by examiner

*Primary Examiner* — Vuthe Siek
(74) *Attorney, Agent, or Firm* — Lerner, David, Littenberg, Krumholz & Mentlik, LLP

(57) ABSTRACT

The present invention relates to a system and a method of protecting a battery, and particularly to a system and a method of protecting a battery, which compare current state information of a battery with reference state information and control an operation of a power supplying unit that supplies power supplied from the battery to a load based on a result of the comparison in order to block power supplied from the battery that is in a problem state, thereby protecting a load from the battery in the problem state.

18 Claims, 7 Drawing Sheets

BATTERY PROTECTION SYSTEM AND METHOD

CROSS-REFERENCE TO RELATED APPLICATIONS

This application claims priority to and the benefit of Korean Patent Application No. 10-2016-0135817 filed in the Korean Intellectual Property Office on Oct. 19, 2016, the entire contents of which are incorporated herein by reference.

TECHNICAL FIELD

The present invention relates to a system and a method of protecting a battery, and particularly to a system and a method of protecting a battery, which compare current state information of a battery with reference state information, and control an operation of a power supplying unit that supplies power supplied from the battery to a load based on a result of the comparison in order to block power supplied from the battery that is in a problem state, thereby protecting a load from the battery in the problem state.

BACKGROUND ART

A secondary battery having high application easiness according to a product group and an electric characteristic, such as high energy density, is universally applied in an electric vehicle (EV) and a hybrid vehicle (HV) driven by an electric driving source, or an energy storage system (ESS) or an uninterruptible power supply (UPS) system using a medium and large battery used for a household or an industry, as well as a portable device.

The secondary battery attracts attention as a new energy source for improving environmentally-friendly and energy efficiency in that it is possible to innovatively decrease use of fossil energy, which is the primary advantage, while not generating a by-product when using energy.

A battery applied to the EV or an energy storage source is generally used in a form in which a plurality of unit secondary battery cells is gathered to increase suitability to a high capacity environment, which is, however, not essentially applied to the case where the secondary battery is implemented as a battery of a portable terminal and the like.

In the case where the secondary battery is used in the form in which the plurality of unit secondary battery cells is gathered, when an operation problem, such as a flow of an overcurrent, is generated, there may be a problem in that the unit cell is inflated and damaged by overheating, so that it must be considered that overcharge or overdischarge always needs to be prevented from being applied to the unit cell by measuring and monitoring various state values, such as a voltage and a temperature, of each individual cell.

A battery protecting system in the related art supplies power of a battery to a load by using an integrated circuit (IC), such as a low drop output (LDO) regulator and a DC-DC converter, in which a power supply function and a battery protecting function are embedded, and protects the load from an overvoltage and an overcurrent generated in the battery. However, the IC including the battery protecting function has a problem in momentarily cutting an output when a state problem of the battery is detected, and continuously repeating abnormal on/off of the output when a situation of the load is not changed. Referring to FIGS. 1A and 1B, when a battery performing a normal operation has a problem as illustrated in FIG. 1A, a battery protecting system needs to block power supplied from a battery as denoted with t1. However, the battery protecting system in the related art momentarily cuts an output when an overcurrent and an overvoltage are generated, and continuously repeats abnormal on/off of the output when a situation of a load is not changed as illustrated in FIG. 1B. As described above, when the abnormal on/off is repeated, the battery protecting system and other constituent elements included in a battery management system and a load may perform abnormal operations, and the load fails to be completely protected, thereby causing damage to the load.

RELATED ART DOCUMENT

Patent Document

Korean Patent No. 10-0621072

SUMMARY OF THE INVENTION

An object of the present invention is to provide a system and a method of protecting a battery, which compare current state information of a battery with reference state information and control an operation of a power supplying unit that supplies power supplied from the battery to a load based on a result of the comparison in order to block power supplied from the battery that is in a problem state, thereby protecting a load from the battery in the problem state.

Another object of the present invention is to provide a system and a method of protecting a battery, which maintain a stop state of a power supplying unit before a signal resuming an operation of the power supplying unit is input from the outside when the operation of the power supplying unit is stopped, thereby preventing an abnormal on/off operation of the power supplying unit.

An exemplary embodiment of the present invention provides a system for protecting a battery, the system including: a reference state information generating unit which generates reference state information of a battery; a comparing unit which compares current state information of the battery with the generated reference state information and outputs a comparison result signal; and a protection circuit unit which blocks power output from the battery based on the comparison result signal.

The protection circuit unit may include: a state information obtaining unit which obtains the current state information of the battery; a power supplying unit which supplies the power supplied from the battery to the load; and a control unit which diagnoses a state of the battery based on the obtained state information and outputs an operation control signal for controlling an operation of the power supplying unit based on a result of the diagnosis.

The protection circuit unit may block the power output from the battery based on at least one of the operation control signal and the comparison result signal.

The reference state information may be a voltage value, and the comparison result signal may be output when a voltage value obtained from the battery is equal to or smaller than the reference voltage value.

The reference state information may be a temperature value, and the comparison result signal may be output when a temperature value obtained from the battery is equal to or larger than the reference temperature value.

When an operation of the power supplying unit is in a stop state, the power supplying unit may maintain a stop state regardless of the obtained state information of the battery, an output of the comparison result signal, and an output of the operation control signal.

The comparing unit may output the comparison result signal to a main control unit positioned at the outside, and receive an initialization signal or an operation control signal as a response to the output comparison result signal.

When the operation of the power supplying unit is in the stop state, the power supplying unit may maintain a stop state until the initialization signal or the operation control signal is input from the main control unit.

The power supplying unit may include at least one of a low drop out (LDO) regulator and a DC-DC converter.

The system may further include an output voltage providing unit which provides a current voltage value of the battery to the comparing unit when the reference state information is a voltage value, in which the output voltage providing unit may include one or more resistors, and may provide the voltage value of the battery applied to at least one of the one or more resistors to the comparing unit.

Another exemplary embodiment of the present invention may provide a method of protecting a battery, the method including: generating reference state information of a battery; comparing current state information of the battery with the generated reference state information and outputting a comparison result signal; and blocking power output from the battery based on the comparison result signal.

The blocking may include: obtaining the current state information of the battery; supplying the power supplied from the battery to the load; and diagnosing a state of the battery based on the obtained state information, and outputting an operation control signal for controlling an operation of the power supplying unit based on the diagnosis result.

The blocking may further include blocking the power output from the battery based on at least one of the operation control signal and the comparison result signal.

The outputting may include outputting the comparison result signal when the reference state information is a voltage value and a voltage value obtained from the battery is equal to or smaller than the reference voltage value.

The outputting may further include outputting the comparison result signal when the reference state information is a temperature value and a temperature value obtained from the battery is equal to or larger than the reference temperature value.

The method may further include when the operation of the power supplying unit is in a stop state, maintaining the stop state regardless of the obtained state information of the battery, an output of the comparison result signal, and an output of the operation control signal.

The outputting may further include: outputting the comparison result signal to a main control unit positioned at the outside; and receiving an initialization signal or an operation control signal as a response to the output comparison result signal.

The method may further include when the operation of the power supplying unit is in a stop state, maintaining the stop state until the initialization signal or the operation control signal is input from the main control unit.

The supplying may include including at least one of a low drop out (LDO) regulator and a DC-DC converter.

According to an aspect of the present invention, it is possible to provide a system and a method of protecting a battery, which compare current state information of a battery with reference state information, and control an operation of a power supplying unit that supplies power supplied from the battery to a load based on a result of the comparison in order to block power supplied from the battery that is in a problem state, thereby protecting a load from the battery in the problem state.

It is also possible to provide a system and a method of protecting a battery, which maintain a stop state of a power supplying unit before a signal resuming an operation of the power supplying unit is input from the outside when the operation of the power supplying unit is stopped, thereby preventing an abnormal on/off operation of the power supplying unit.

DETAILED DESCRIPTION

The present invention will be described in detail below with reference to the accompanying drawings. Herein, repeated descriptions and the detailed description of a publicly known function and configuration that may make the gist of the present invention unnecessarily ambiguous will be omitted. Exemplary embodiments of the present invention are provided so as to more completely explain the present invention to those skilled in the art. Accordingly, the shape, the size, etc., of elements in the figures may be exaggerated for a more clear explanation.

Throughout the specification and the claims, unless explicitly described to the contrary, the word "include/comprise" and variations such as "includes/comprises" or "including/comprising" mean further including other constituent elements, not excluding the other constituent elements.

The term " . . . unit" described in the specification means a unit for processing at least one function and operation and may be implemented by hardware components or software components and combinations thereof.

Figure 1A:
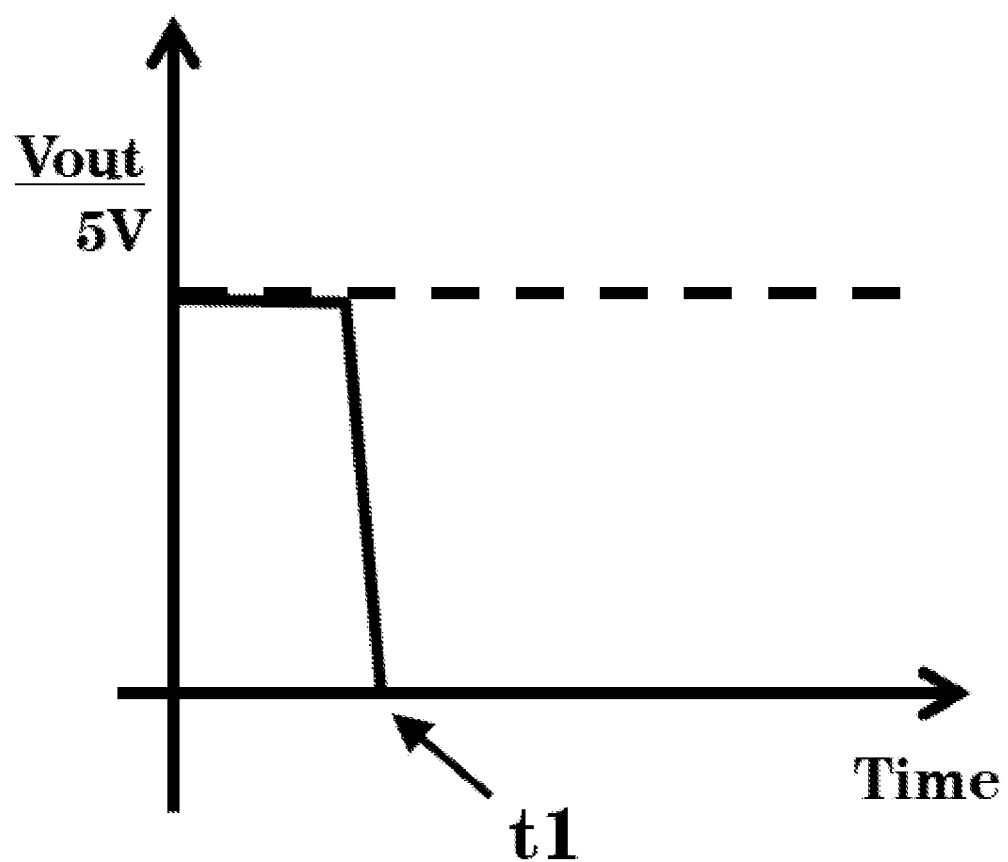
FIGS. 1A and 1B are diagrams illustrating a comparison of an ideal graph output image and an actual graph output image of a battery output voltage when a battery protecting system in the related art is used.
Figure 1B:
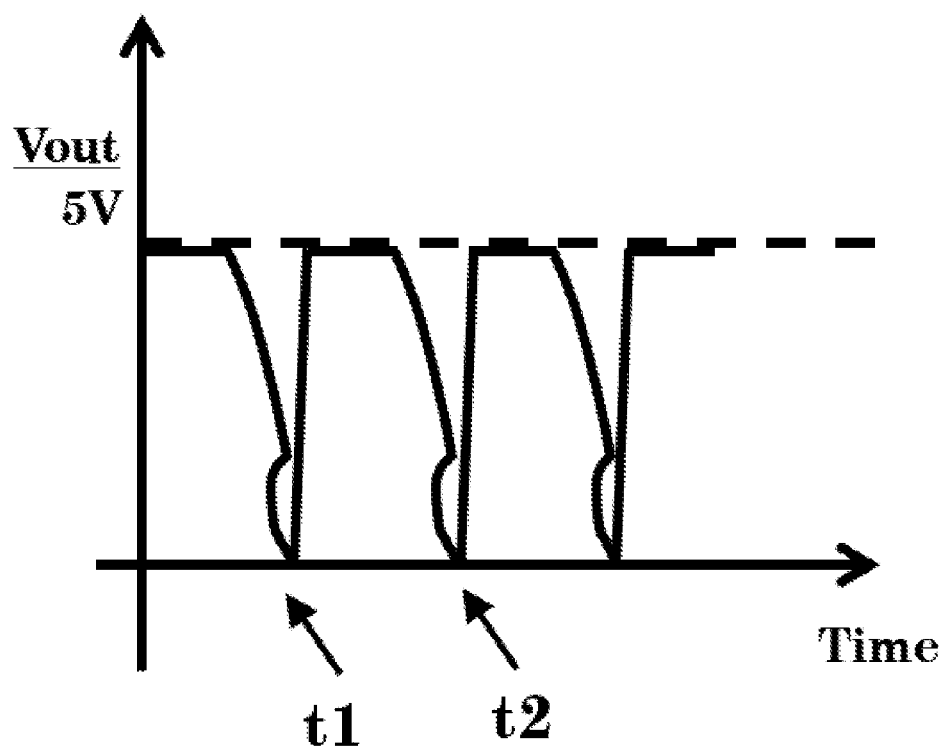
Figure 2:
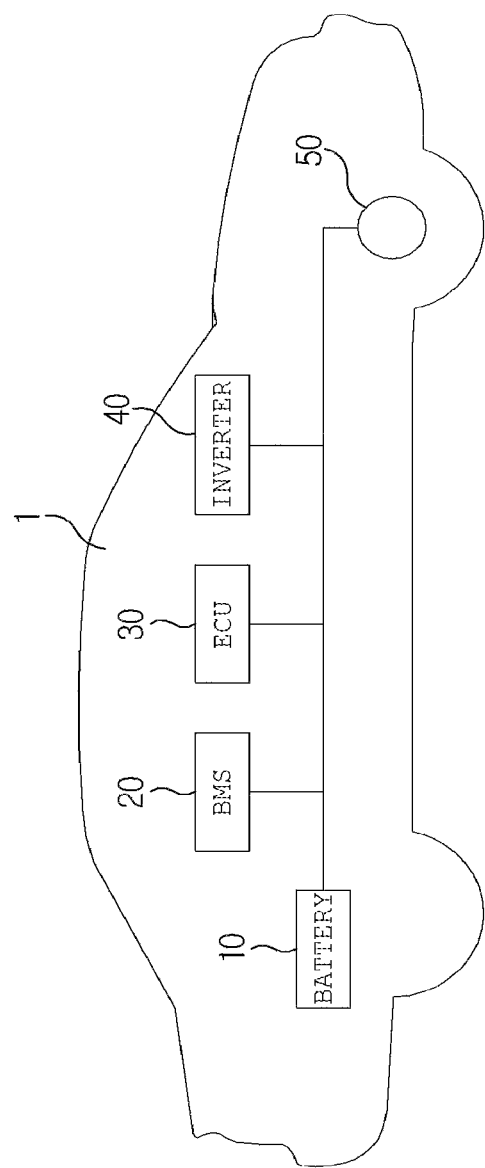
FIG. 2 is a diagram schematically illustrating an electric vehicle to which a battery protecting system according to an exemplary embodiment of the present invention is applicable.

FIG. 2 is a diagram schematically illustrating an electric vehicle to which a battery protecting system according to an exemplary embodiment of the present invention is applicable.

FIG. 2 illustrates an example, in which a battery protecting system 100 according to an exemplary embodiment of the present invention is applied to an electric vehicle 1, but the battery protecting system according to the exemplary embodiment of the present invention is applicable to any technical field, such as an energy storage system (ESS) for household or an industry, or an uninterruptible power supply (UPS) system, to which a secondary battery is applicable, in addition to the electric vehicle.

The electric vehicle 1 may include a battery 10, a battery management system 20, an electronic control unit (ECU) 30, an inverter 40, and a motor 50.

The battery 10 is an electric energy source which provides driving force to the motor 50 and drives the electric vehicle 1. The battery 10 may be charged or discharged by the inverter 40 according to the driving of the motor 50 and/or an internal combustion engine (not illustrated).

Herein, the kind of battery 10 is not particularly limited, and the battery 10 may include, for example, a lithium ion battery, a lithium polymer battery, a nickel cadmium battery, a nickel hydrogen battery, and a nickel zinc battery.

The battery 10 is formed of a battery pack in which a plurality of battery cells is connected in series and/or in parallel. Further, the battery 10 may include one or more battery packs.

The BMS 20 estimates a state of the battery 10, and manages the battery 10 by using information on the estimated state. For example, the BMS 20 estimates and manages state information, such as a state of charging (SOC), a state of health (SOH), a maximum input/output power allowance quantity, and an output voltage of the battery 10, about the battery 10. Further, the BMS 20 controls a charge or a discharge of the battery 10 by using the state information, and further, may also estimate a replacement time of the battery 10.

The BMS 20 may include the battery protecting system 100 according to the exemplary embodiment of the present invention which is to be described below, or may be connected to the battery protecting system and operated. The BMS 20 may block power supplied from a battery in a problem state based on an operation control signal output from the control unit 133 and a comparison result signal output from the comparing unit 120 in order to control an operation of the power supplying unit 132 included in the battery protecting system 100. Further, the BMS 20 may maintain a stop state of the power supplying unit to prevent the power supplying unit from being abnormally on/off.

The ECU 30 is an electronic control device controlling a state of the electric vehicle 1. For example, the ECU 30 determines the degree of torque based on information, such as an accelerator, a break, and a speed, and controls an output of the motor 50 to be matched to the torque information.

The ECU 30 transmits a control signal to the inverter 40 so that the battery 10 is charged or discharged by the BMS 20.

The inverter 40 allows the battery 10 to be charged or discharged based on a control signal of the ECU 30.

The motor 50 drives the electric vehicle 1 based on the control information (for example, torque information) transmitted from the ECU 30 by using electric energy of the battery 10.

Hereinafter, the battery protecting system 100 according to the exemplary embodiment of the present invention will be described with reference to FIGS. 3 to 6.

Figure 3:
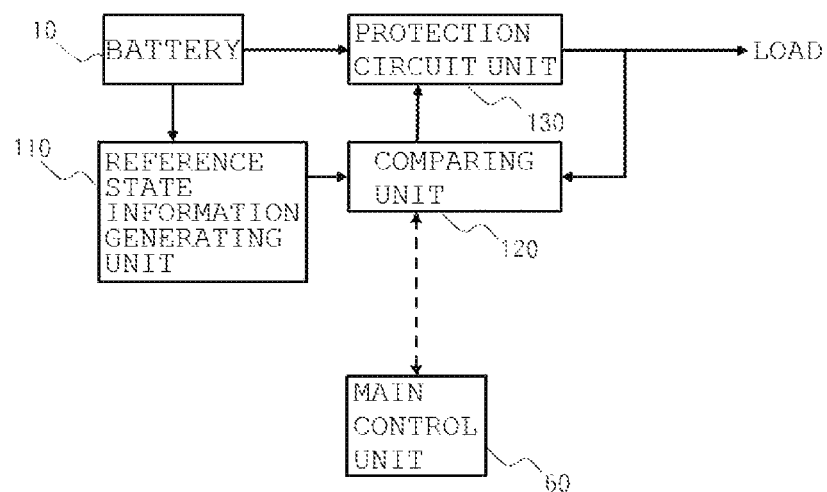
FIGS. 3 to 5 are diagrams schematically illustrating a battery protecting system according to an exemplary embodiment of the present invention.
Figure 4:
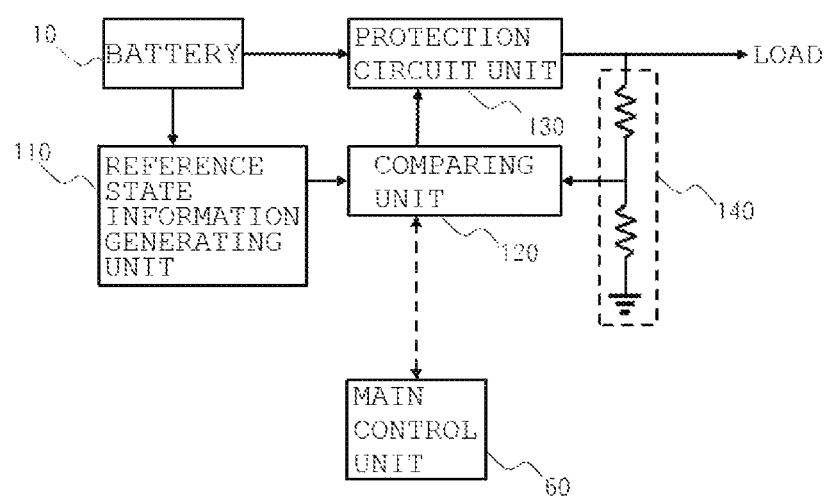
Figure 5:
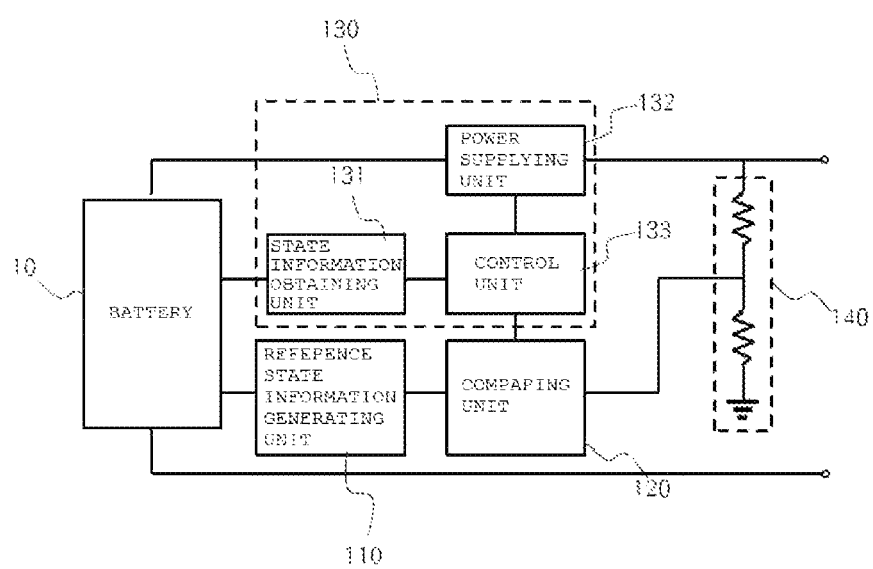

FIGS. 3 to 5 are diagrams schematically illustrating the battery protecting system according to the exemplary embodiment of the present invention.

Referring to FIGS. 3 to 5, the battery protecting system 100 according to the exemplary embodiment of the present invention may include a reference state information generating unit 110, a comparing unit 120, and a protection circuit unit 130.

The battery protecting system 100 illustrated in FIGS. 3 to 5 are the exemplary embodiment, and constituent elements thereof are not limited to the exemplary embodiment illustrated in FIGS. 3 to 5, and may be added, changed, or deleted as necessary.

The reference state information generating unit 110 may generate reference state information of a battery. Herein, the state information means information obtained for diagnosing a problem of the battery 10. For example, the state information may include one or more of a voltage, a current, a temperature, a residual capacity, and residual life of the battery 10. Further, the reference state information may be a value within an allowable range when the battery 10 is used. For example, when the state information is a temperature value, the reference state information may be −20° C. that is a minimum allowable temperature of the battery 10 and 60° C. that is a maximum allowable temperature of the battery 10. For another example, when the state information is a voltage value, the reference state information generating unit 110 may include one or more zenor diodes, and may generate a reference voltage by using the zenor diode. Further, the reference state information generating unit 110 limits power applied to the comparing unit 120, which is to be described below, through the zenor diode, thereby enabling the battery 10 to be normally operated even in a situation where a high voltage is applied to the comparing unit 120.

The reference state information generating unit 110 may provide the generated reference state information of the battery 10 to the comparing unit 120 which is to be described below, to enable the comparing unit 120 to output a comparison result signal.

In another exemplary embodiment, the reference state information generating unit 110 may store state information input during a process of manufacturing and using the battery protecting system 100. Accordingly, the reference state information generating unit 110 may provide reference state information stored in the comparing unit 120 which is to be described below through the input state information.

The comparing unit 120 may compare current state information of the battery 10 with the reference state information generated by the reference state information generating unit 110, and output a comparison result signal. Herein, the comparison result signal is a signal based on which it is determined whether the battery 10 has a problem. For example, when the reference state information is a voltage, the reference state information generating unit 110 may set a reference voltage having a predetermined range. Further, the comparing unit 120 may compare a voltage currently output from the battery with the generated reference voltage, and output a comparison result signal based on the comparison. For example, the comparing unit 120 may include one or more operating amplifiers. When an abnormal voltage is generated in the battery 10, the protection circuit unit 130 which is to be described below may momentarily block power supplied from the battery 10. Accordingly, the output voltage of the battery 10 is changed, and the operating amplifier may output a low signal at a time at which the output voltage is dropped below the reference voltage. Herein, the low signal may be a comparison result signal, and when the low signal is output, the protection circuit unit 130 may control the control unit 133 which is to be described below to stop an operation of the power supplying unit 132.

As described above, when the reference state information is the voltage value, the comparison result signal may be output when the voltage value obtained from the battery 10 is equal to or smaller than a reference voltage value. In addition, when the reference state information is the temperature value, the comparison result signal may be output when the temperature value obtained from the battery 10 is equal to or larger than a reference temperature value.

When the reference state information is the voltage value, the comparing unit 120 may receive an output voltage of the battery 10 that is current state information of the battery 10 form the output voltage providing unit 140. The output voltage providing unit 140 may include one or more resistors. The output voltage providing unit 140 may provide an output voltage of the battery 10 applied to the resistor to the comparing unit 120 to make the comparing unit 120 output a comparison result signal.

The comparing unit 120 may include a communicating unit (not illustrated), and may output the output comparison result signal to the main control unit 60 positioned at the outside through the communicating unit, and receive an initialization signal or an operation control signal as a response to the output comparison result signal. The main control unit 60 may be positioned outside the battery protecting system 100 according to the exemplary embodiment of the present invention and control an operation of the battery protecting system 100 or control constituent elements included in the BMS 20. The initialization signal may be a reset signal initializing information set in the battery protecting system 100. For example, when it is diagnosed that the battery 10 has a problem and an operation of the power supplying unit 132 which is to be described below is in a stop state, the initialization signal may be a signal releasing a stop state of the power supplying unit 132. Further, the operation control signal may be a signal for controlling the operation of the power supplying unit 132. For example, when it is diagnosed that the battery 10 has the problem, but power is continuously supplied through the power supplying unit 132, the operation control signal may be a signal changing a state of the power supplying unit 132 to a stop state.

The protection circuit unit 130 may block power output from the battery 10 based on the comparison result signal output from the comparing unit 120. To this end, the protection circuit unit 130 may include a state information obtaining unit 131, the power supplying unit 132, and the control unit 133.

The state information obtaining unit 131 may obtain current state information of the battery 10. The state information obtaining unit 131 may include one or more state information obtaining units 131 for measuring state information about one or more of a voltage, a current, a temperature, a residual capacity, and residual life. For example, the state information obtaining unit 131 may include one or more voltage measuring units and one or more temperature measuring units.

The power supplying unit 132 may supply the power supplied from the battery 10 to a load. For example, the power supplying unit 132 may include one or more of a low drop out (LDO) regulator and a DC-DC converter to stably supply the power supplied from the battery 10 to a load. Further, the power supplying unit 132 may be a power integrated circuit (power IC) which converts, distributes, and manages power of the battery 10.

The control unit 133 may diagnose a state of the battery 10 based on the obtained state information, and output an operation control signal for controlling the operation of the power supplying unit 132 based on a result of the diagnosis. The control unit 133 may receive the reference state information from the reference state information generating unit 110, and diagnose a state of the battery 10 based on the received reference state information. For example, when the state information is a temperature value, the reference state information may be −20° C. that is a minimum allowable temperature of the battery 10 and 60° C. that is a maximum allowable temperature of the battery 10. When the temperature of the battery measured through the state information obtaining unit 131 exceeds 60° C., the control unit 133 may diagnose that the battery 10 is in a high temperature state based on the reference state information received from the reference state information generating unit 110 and the current state information of the battery 10 received from the state information obtaining unit 131. For another exemplary embodiment, the control unit 133 may diagnose the state of the battery 10 through pre-stored reference state information.

When it is diagnosed that the battery 10 has the problem, the control unit 133 may output an operation control signal for controlling the operation of the power supplying unit 132. Herein, the operation control signal may be a signal for controlling the operation of the power supplying unit 132 as described above. For example, the power supplying unit 132 may include one or more switches (not illustrated), and the operation control signal may be a switch control signal controlling an open/close of the one or more switches. The control unit 133 may change the operation of the power supplying unit 132 to be in the stop state by turning off the one or more switches through the operation control signal.

When one or more signals between the operation control signal output from the control unit 133 and the comparison result signal output from the comparing unit 120 are output, the protection circuit unit 130 may control the operation of the power supplying unit 132 to be in the stop state and block the power output from the battery 10. For example, the control unit 133 outputs the operation control signal when the comparison result signal is input from the comparing unit 120, thereby controlling the operation of the power supplying unit 132.

When the operation of the power supplying unit 132 is controlled through the control unit 133, so that the power supplying unit 132 is in the stop state, the power supplying unit 132 may maintain the stop state regardless of the state information of the battery 10 obtained from the state information obtaining unit 131, the comparison result signal output from the comparing unit 120, and the operation control signal output from the control unit 133. For example, when the control unit 133 diagnoses that the battery 10 first has the problem, the control unit 133 may output the operation control signal and control the power supplying unit 132 to be in the stop state. Then, when the state information obtained from the battery 10 is equal to the reference state information or is included in a reference state information range, the control unit 133 may diagnose that the state of the battery 10 is a normal state and output an operation control signal for releasing the stop state of the power supplying unit 132. However, even though the operation control signal for releasing the stop state of the power supplying unit 132 is output, the power supplying unit 132 may continuously maintain the stop state. Accordingly, it is possible to prevent the power supplying unit 132 from being abnormally on/off.

The power supplying unit 132 may maintain the stop state until an initialization signal or an operation control signal is input from the main control unit 60. For example, the power supplying unit 132 may receive an initialization signal or an operation control signal as a response to the comparison result signal that is output to the main control unit 60 through the comparing unit 120. The main control unit 60 may output the initialization signal when the state of the battery 10 is the normal state, and the protection circuit unit 130 receiving the initialization signal may initialize the set information and release the stop state of the power supplying unit 132.

Hereinafter, a battery protecting method S100 according to an exemplary embodiment of the present invention will be described with reference to FIG. 6.

Figure 6:
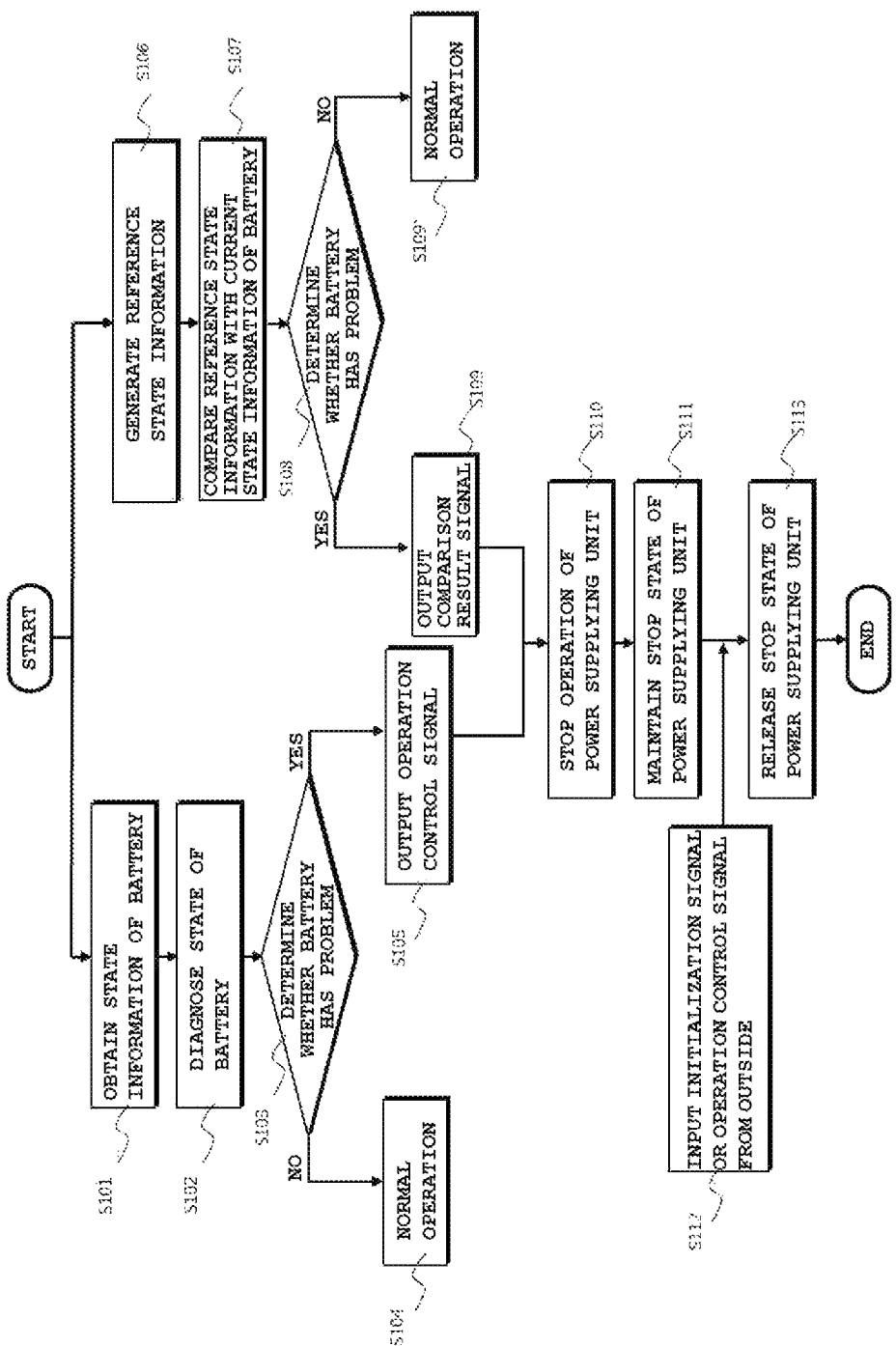
FIG. 6 is a flowchart for describing a battery protecting method according to an exemplary embodiment of the present invention.

FIG. 6 is a flowchart for describing a battery protecting method according to an exemplary embodiment of the present invention.

Referring to FIG. 6, when the battery protecting method S100 according to the exemplary embodiment of the present invention is initiated, state information of a battery is obtained through the state information obtaining unit (S101). It is determined whether the battery has a problem by diagnosing a state of the battery based on the state information of the battery obtained in operation S101 (S102 and S103). When it is diagnosed that the battery has no problem through operation S103, the power supplying unit is normally operated and supplies power supplied form the battery to a load (S104). In the meantime, when the battery has the problem, the control unit outputs an operation control signal for controlling an operation of the power supplying unit (S105). Further, the reference state information generating unit generates reference state information (S106). The comparing unit compares the reference state information generated through operation S106 with current state information of the battery, and diagnoses whether the battery has a problem based on a result of the comparison (S107 and S108). When it is diagnosed that the battery has no problem in operation S108, the comparing unit does not output a comparison result signal, and the power supplying unit is normally operated and supplies power to the load. When it is diagnosed that the battery has no problem through operation S108, the power supplying unit is normally operated and supplies power supplied form the battery to a load (S109'). And, when it is diagnosed that the battery has the problem in operation S108, the comparing unit outputs a comparison result signal (S109). The control unit controls an operation of the power supplying unit based on the operation control signal output in operation S105 or the comparison result signal output in operation S109, and changes a state of the power supplying unit to a stop state under the control (S110). Then, the power supplying unit changed to be in the stop state continuously maintains the stop state regardless of the obtained state information of the battery, the operation control signal output from the control unit, and the comparison result signal output from the comparing unit (S111). In addition, the comparing unit may output the comparison result signal in operation S109 to the main control unit positioned at the outside, and may receive an initialization signal or an operation control signal from the main control unit as a response to the output comparison result signal (S112). When the initialization signal or the operation control signal is received from the main control unit in operation S112, the stop state of the power supplying unit is released (S113). When the operation control signal received from the main control unit is a signal continuously maintaining the stop state, the power supplying unit continuously maintains the stop state.

The foregoing battery protecting method S100 has been described with reference to the flowchart presented in the drawing. For the simple description, the method is illustrated in a series of blocks and described, but the present invention is not limited to the sequence of the blocks, and some blocks may be performed in a different order or at the same time as that of other blocks illustrated and described in the present specification, and various branches, flow paths, and block sequences achieving the same or similar result may be carried out. Further, all of the blocks illustrated for carrying out the method described in the present specification may not be required.

In the forgoing, the specific exemplary embodiment of the present invention has been illustrated and described, but it is apparent to those skilled in the art that the technical spirit of the present invention is not limited by the accompanying drawings and the described contents, and may be modified in various forms without departing from the spirit of the present invention, and the modifications are considered to belong to the claims of the present invention without departing from the spirit of the present invention.

What is claimed is:

1. A system for protecting a battery, the system comprising a battery management system coupled to the battery, to a load, and to a main control unit, the battery management system further comprising a second control unit, wherein the battery management system is further configured to:
   generate reference state information of the battery;
   compare current state information of the battery with the generated reference state information;
   output a comparison result signal to each of the main control unit and the second control unit based on the comparison of current state information of the battery with the generated reference state information;
   at the second control unit, set the battery management system to a stop state; and
   block a power output from the battery to the load based on the comparison result signal until a signal releasing the stop state is received from the main control unit.

2. The system of claim 1, wherein the battery management system is further configured to:
   obtain the current state information of the battery; and
   supply the power supplied from the battery to the load; and
   wherein the control unit is further configured to:
   diagnose a state of the battery based on the obtained state information; and
   output an operation control signal for controlling the supply of power supplied from the battery based on a result of the diagnosis.

3. The system of claim 2, wherein the battery management system is further configured to block the power output from the battery based on the operation control signal.

4. The system of claim 1, wherein the reference state information is a voltage value, and the comparison result signal is output when a voltage value obtained from the battery is equal to or smaller than the reference voltage value.

5. The system of claim 1, wherein the reference state information is a temperature value, and the comparison result signal is output when a temperature value obtained from the battery is equal to or larger than the reference temperature value.

6. The system of claim 2, wherein the battery management system is configured to maintain the stop state regardless of the obtained state information of the battery, the comparison result signal, and the operation control signal.

7. The system of claim 2, wherein the signal releasing the stop state is an initialization signal or an operation control signal, and is received as a response to the outputted comparison result signal.

8. The system of claim 7, wherein the battery management system is configured to maintain the stop state until the initialization signal or the operation control signal is received from the main control unit.

9. The system of claim 2, wherein the battery management system is configured to supply the power supplied from the battery using at least one of a low drop out (LDO) regulator or a DC-DC converter.

10. A method of protecting a battery, the method performed by a battery management system coupled to the battery, to a load, and to a main control unit, the battery management system further comprising a second control unit, the method comprising:
   generating reference state information of a battery;
   comparing current state information of the battery with the generated reference state information and outputting a comparison result signal;
   outputting a comparison result signal to each of the main control unit and the second control unit based on the comparison of current state information of the battery with the generated reference state information;
   the second control unit setting the battery management system to a stop state; and
   blocking power output from the battery to the load based on the comparison result signal until a signal releasing the stop state is received from the main control unit.

11. The method of claim 10, wherein the blocking includes:
   obtaining the current state information of the battery;
   supplying the power supplied from the battery to the load; and
   diagnosing a state of the battery based on the obtained state information, and outputting an operation control signal for controlling the supply of power supplied from the battery based on the diagnosis result.

12. The method of claim 11, wherein the blocking further includes blocking the power output from the battery based on at least one of the operation control signal and the comparison result signal.

13. The method of claim 10, wherein the outputting includes outputting the comparison result signal when the reference state information is a voltage value and a voltage value obtained from the battery is equal to or smaller than the reference voltage value.

14. The method of claim 10, wherein the outputting further includes outputting the comparison result signal when the reference state information is a temperature value and a temperature value obtained from the battery is equal to or larger than the reference temperature value.

15. The method of claim 11, further comprising:
   maintaining the stop state regardless of the obtained state information of the battery, the comparison result signal, and the operation control signal.

16. The method of claim 11, wherein the signal releasing the stop state is an initialization signal or an operation control signal received as a response to the outputted comparison result signal.

17. The method of claim 16, further comprising:
   maintaining the stop state until the initialization signal or the operation control signal is received from the main control unit.

18. The method of claim 11, wherein the supplying includes supplying the power supplied from the battery using at least one of a low drop out (LDO) regulator and a DC-DC converter.

* * * * *